(12) United States Patent
Hennelly et al.

(10) Patent No.: US 9,500,867 B2
(45) Date of Patent: Nov. 22, 2016

(54) HEAD-TRACKING BASED SELECTION TECHNIQUE FOR HEAD MOUNTED DISPLAYS (HMD)

(71) Applicant: Kopin Corporation, Westborough, MA (US)

(72) Inventors: Sean Hennelly, West Bridgford (GB); Nathan Andrews, West Bridgford (GB); Christopher Parkinson, Richland, WA (US)

(73) Assignee: Kopin Corporation, Westborough, MA (US)

( * ) Notice: Subject to any disclaimer, the term of this patent is extended or adjusted under 35 U.S.C. 154(b) by 0 days.

(21) Appl. No.: 14/540,939

(22) Filed: Nov. 13, 2014

(65) Prior Publication Data
US 2015/0138084 A1    May 21, 2015

Related U.S. Application Data

(60) Provisional application No. 61/905,148, filed on Nov. 15, 2013.

(51) Int. Cl.
*G06F 3/033* (2013.01)
*G02B 27/01* (2006.01)
(Continued)

(52) U.S. Cl.
CPC ......... *G02B 27/017* (2013.01); *G02B 27/0101* (2013.01); *G06F 3/012* (2013.01);
(Continued)

(58) Field of Classification Search
CPC ........ G06F 3/011; G06F 3/012; G06F 3/017; G06F 3/033; G06F 3/04812; G06F 3/0482; G06F 3/0484; G06F 3/04842; G02B 27/017; G02B 2027/014; Y10S 715/977
See application file for complete search history.

(56) References Cited

U.S. PATENT DOCUMENTS 4,836,670 A    6/1989  Hutchinson
5,633,993 A *  5/1997  Redmann ................ G06F 3/011
                                            345/419

(Continued)

FOREIGN PATENT DOCUMENTS

EP         2 098 947       9/2009
WO    WO 2015/073869       5/2015
(Continued)

OTHER PUBLICATIONS

International Search Report and Written Opinion of PCT/US2014/065778 dated Mar. 4, 2015 entitled "Text Selection Using HMD Head-Tracker and Voice-Command".
(Continued)

*Primary Examiner* — Joe H Cheng
(74) *Attorney, Agent, or Firm* — Hamilton, Brook, Smith & Reynolds, P.C.

(57) ABSTRACT

A method of performing a hands-free selection of an object on a display includes displaying various objects within a screen view on a display, and moving a pointer-timer, in response to movements of the headset computer, to a selectable object within the screen view. The method further includes selecting the selectable object if the pointer-timer overlaps the selectable object for a predetermined amount of time. The method may further include transitioning the pointer-timer from a first state to a second state over a predetermined period of time. The pointer-timer may include a collection of elements that sequentially transitions from the first state to the second state, such that the collection of elements gradually changes from all being in the first state to all being in the second state.

12 Claims, 7 Drawing Sheets

(51) Int. Cl.
*G06F 3/0484* (2013.01)
*G06F 3/0481* (2013.01)
*G06F 3/01* (2006.01)
*G06F 3/0482* (2013.01)

(52) U.S. Cl.
CPC ............ *G06F 3/033* (2013.01); *G06F 3/0482* (2013.01); *G06F 3/04812* (2013.01); *G06F 3/04842* (2013.01); *G02B 2027/014* (2013.01)

(56) References Cited

U.S. PATENT DOCUMENTS

| | | | |
|---|---|---|---|
| 5,999,895 A | 12/1999 | Forest | |
| 6,084,556 A * | 7/2000 | Zwern | G09B 21/008 345/158 |
| 6,100,871 A | 8/2000 | Min | |
| 6,124,843 A * | 9/2000 | Kodama | G02B 27/017 345/157 |
| 6,278,975 B1 | 8/2001 | Brant et al. | |
| 6,313,864 B1 | 11/2001 | Tabata | |
| 7,403,898 B2 | 7/2008 | Slemmer | |
| 7,489,297 B2 * | 2/2009 | Hohmann | G06F 3/043 345/156 |
| 8,643,951 B1 * | 2/2014 | Wheeler | G06F 3/012 359/630 |
| 8,745,058 B1 * | 6/2014 | Garcia-Barrio | G06F 17/30058 707/737 |
| 8,830,165 B1 | 9/2014 | Heath | |
| 8,929,954 B2 | 1/2015 | Jacobsen | |
| 9,122,307 B2 | 9/2015 | Jacobsen | |
| 9,141,197 B2 | 9/2015 | MacDougall | |
| 9,235,272 B1 | 1/2016 | Brooks | |
| 9,311,718 B2 | 4/2016 | Scavezze | |
| 9,383,816 B2 | 7/2016 | Hennelly | |
| 2006/0041433 A1 | 2/2006 | Slemmer et al. | |
| 2008/0114603 A1 | 5/2008 | Desrochers | |
| 2008/0316212 A1 | 12/2008 | Kushler | |
| 2009/0228842 A1 | 9/2009 | Westerman | |
| 2009/0243967 A1 | 10/2009 | Kato | |
| 2010/0235726 A1 | 9/2010 | Ording et al. | |
| 2011/0187640 A1 | 8/2011 | Jacobsen et al. | |
| 2012/0035934 A1 * | 2/2012 | Cunningham | G06F 1/1639 704/260 |
| 2012/0127082 A1 | 5/2012 | Kushler | |
| 2012/0236025 A1 | 9/2012 | Jacobsen et al. | |
| 2013/0006957 A1 | 1/2013 | Huang | |
| 2013/0141360 A1 | 6/2013 | Compton et al. | |
| 2013/0147836 A1 | 6/2013 | Small | |
| 2013/0169532 A1 * | 7/2013 | Jahnke | G06F 3/013 345/158 |
| 2013/0271360 A1 | 10/2013 | MacDougall et al. | |
| 2013/0288753 A1 | 10/2013 | Jacobsen et al. | |
| 2013/0300661 A1 | 11/2013 | Ezra | |
| 2014/0195918 A1 | 7/2014 | Friedlander | |
| 2014/0358536 A1 | 12/2014 | Choi | |
| 2015/0138073 A1 | 5/2015 | Hennelly | |
| 2015/0138074 A1 | 5/2015 | Hennelly et al. | |
| 2015/0142440 A1 | 5/2015 | Parkinson et al. | |
| 2015/0227209 A1 | 8/2015 | Nicholson | |
| 2015/0331492 A1 | 11/2015 | Woo | |

FOREIGN PATENT DOCUMENTS

| | | |
|---|---|---|
| WO | WO 2015/073874 | 5/2015 |
| WO | WO 2015/073879 | 5/2015 |
| WO | WO 2015/073880 | 5/2015 |

OTHER PUBLICATIONS

International Search Report and Written Opinion for PCT/US2014/065788 dated Feb. 26, 2015 entitled "Head-Tracking Based Selection Technique for Head Mounted Displays (HMD)".

International Search Report and Written Opinion of PCT/US2014/065771 entitled "Automatic Speech Recognition (ASR) Feedback for Head Mounted Displays (HMD)" dated Feb. 5, 2015.

International Search Report and Written Opinion of PCT/US2014/065787 entitled "Head Tracking Based Gesture Control Techniques for Head Mounted Displays" dated Feb. 9, 2015.

International Preliminary Report on Patentability for PCT/US2014/065778 dated May 26, 2016 Text Selection Using HMD Head-Tracker and Voice-Command.

International Preliminary Report on Patentability for PCT/US2014/065771 dated May 26, 2016 "Automatic Speech Recognition (ASR) Feedback for Head Mounted Displays (HMD)."

International Preliminary Report on Patentability for PCT/US2014/065787 dated May 26, 2016. "Head Tracking Based Gesture Control Techniques for Head Mounted Displays."

* cited by examiner

HEAD-TRACKING BASED SELECTION TECHNIQUE FOR HEAD MOUNTED DISPLAYS (HMD)

RELATED APPLICATIONS

This application claims the benefit of U.S. Provisional Application No. 61/905,148, filed on Nov. 15, 2013.

This application is related to the following U.S. Patent Applications:

U.S. patent application Ser. No. 14/540,905, filed Nov. 13, 2014, entitled "Text Selection Using HMD Head-tracker and Voice-Command."

U.S. patent application Ser. No. 14/540,943, filed Nov. 13, 2014, entitled "Automatic Speech Recognition (ASR) Feedback For Head Mounted Displays (HMD)."

U.S. patent application Ser. No. 14/540,974, filed Nov. 13, 2014, entitled "Head Tracking Based Gesture Control Techniques For Head Mounted Displays."

The entire teachings of the above applications are incorporated herein by reference.

BACKGROUND OF THE INVENTION

Mobile computing devices, such as notebook PC's, smart phones, and tablet computing devices, are now common tools used for producing, analyzing, communicating, and consuming data in both business and personal life. Consumers continue to embrace a mobile digital lifestyle as the ease of access to digital information increases with high-speed wireless communications technologies becoming ubiquitous. Popular uses of mobile computing devices include displaying large amounts of high-resolution computer graphics information and video content, often wirelessly streamed to the device. While these devices typically include a display screen, the preferred visual experience of a high-resolution, large format display cannot be easily replicated in such mobile devices because the physical size of such device is limited to promote mobility. Another drawback of the aforementioned device types is that the user interface is hands-dependent, typically requiring a user to enter data or make selections using a keyboard (physical or virtual) or touch-screen display. As a result, consumers are now seeking a hands-free high-quality, portable, color display solution to augment or replace their hands-dependent mobile devices.

Head-Mounted Devices (HMD) often contain head-tracking capability. Head-tracking capability allows the HMD to detect the movements of the head in any direction. This detection can then be used for various inputs, such as panning a screen or screen content, or using the head-tracker to position a 'mouse-like' pointer.

Most of the interactions in a computer environment fall into one of three categories: selection, manipulation and navigation.

While head-tracking input is natural for some navigation and direct manipulation tasks, it is inappropriate for tasks that require precise interaction or manipulation.

SUMMARY OF THE INVENTION

Recently developed micro-displays can provide large-format, high-resolution color pictures and streaming video in a very small form factor. One application for such displays can be integrated into a wireless headset computer worn on the head of the user with a display within the field of view of the user, similar in format to eyeglasses, audio headset or video eyewear.

A "wireless computing headset" device, also referred to herein as a headset computer (HSC) or head mounted display (HMD), includes one or more small, high resolution micro-displays and associated optics to magnify the image. The high resolution micro-displays can provide super video graphics array (SVGA) (800×600) resolution or extended graphic arrays (XGA) (1024×768) resolution, or higher resolutions known in the art.

A wireless computing headset contains one or more wireless computing and communication interfaces, enabling data and streaming video capability, and provides greater convenience and mobility through hands dependent devices.

For more information concerning such devices, see co-pending patent applications entitled "Mobile Wireless Display Software Platform for Controlling Other Systems and Devices," U.S. application Ser. No. 12/348,648 filed Jan. 5, 2009, "Handheld Wireless Display Devices Having High Resolution Display Suitable For Use as a Mobile Internet Device," PCT International Application No. PCT/US09/38601 filed Mar. 27, 2009, and "Improved Headset Computer," U.S. Application No. 61/638,419 filed Apr. 25, 2012, each of which are incorporated herein by reference in their entirety.

Embodiments of the present invention provide head-tracking control for selecting objects or actions. The essence of the present invention is that the user can move a pointer around the screen and select available options without having to issue any voice-commands.

This capability is useful in a range of scenarios, such as an environment where quiet or silence is needed, or for a user that has difficulties with issuing voice-commands.

In one aspect, the invention is a headset computer including a display having screen views showing various objects, and a processor coupled to the display. The headset computer operates a graphical user interface in the screen view. The graphical user interface includes a pointer-timer that indicates working of object selection in screen views.

In one embodiment, the pointer-timer transitions from a first state to a second state over a predetermined period of time. The pointer-timer may include a collection of elements that sequentially transition from the first state to the second state, such that the collection of elements gradually changes from all being in the first state to all being in the second state. The first state may be a substantially complete absence of a characteristic, and the second state may be a substantially complete presence of the characteristic. The characteristic may include one or more of color, shading, cross-hatching, visual texturing, or other visual effects known to be useful for visually distinguishing different states within a display.

In one embodiment, the pointer-timer is circular, and the collection of elements is distributed along the perimeter of the pointer-timer. In another embodiment, the pointer-timer transitions from the first state to the second state while the pointer-timer overlaps a selectable object within the screen view. If the pointer-timer remains overlapped with the selectable object when the pointer-timer reaches the second state, the selection of the selectable object may be consummated, i.e., the selectable object may be selected. In one embodiment, the pointer-timer reverts to the first state when the pointer-timer ceases to overlap the selectable object. The reversion to the first state may occur gradually over a predetermined period of time.

In another aspect, the invention is a method of performing a hands-free selection of an object on a display. The method may occur on a headset computer, including a processor. The method may include displaying various objects within a screen view on a display, and moving a pointer-timer, in response to movements of the headset computer, to a selectable object within the screen view. The method may further include selecting the selectable object if the pointer-timer overlaps the selectable object for a predetermined amount of time.

One embodiment further includes transitioning the pointer-timer from a first state to a second state over a predetermined period of time. Another embodiment includes a collection of elements that sequentially transition from the first state to the second state, such that the collection of elements gradually changes from all being in the first state to all being in the second state. The first state may be a substantially complete absence of a characteristic, and the second state is a substantially complete presence of the characteristic. The characteristic may be one or more of color, shading, cross-hatching, visual texturing. In one embodiment, the pointer-timer may be circular, and the collection of elements are distributed along the perimeter of the pointer-timer.

In some embodiments, the pointer-timer transitions from the first state to the second state while the pointer-timer overlaps a selectable object within the screen view. One embodiment further includes consummating the selection of the selectable object if the pointer-timer remains overlapped with the selectable object when the pointer-timer reaches the second state. Another embodiment may further include reverting the pointer-timer to the first state when the pointer-timer ceases to overlap the selectable object. The reversion to the first state may occur gradually over a predetermined period of time.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The teachings of all patents, published applications and references cited herein are incorporated by reference in their entirety.

Figure 1A:
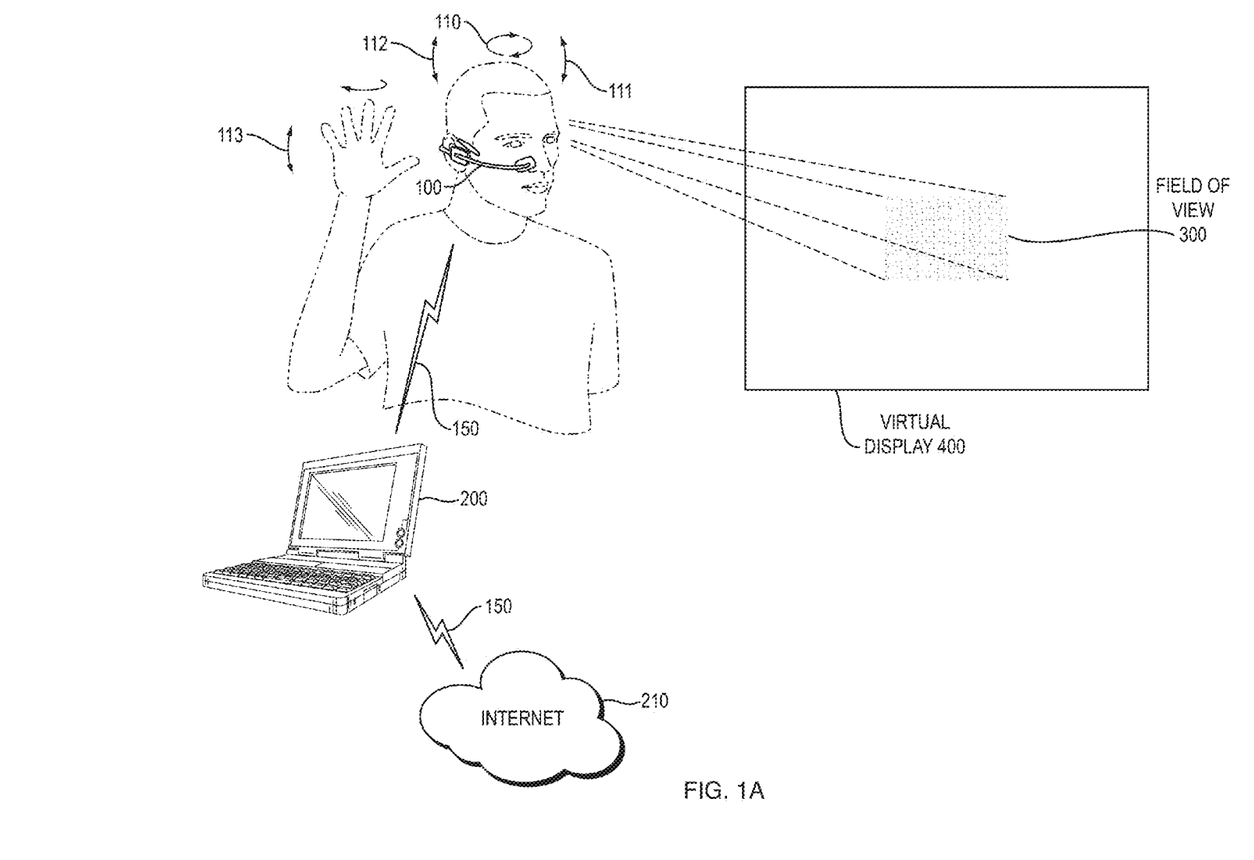
FIGS. 1A-1B are schematic illustrations of a headset computer cooperating with a host computer (e.g., Smart Phone, laptop, etc.) according to principles of the present invention.
Figure 1B:
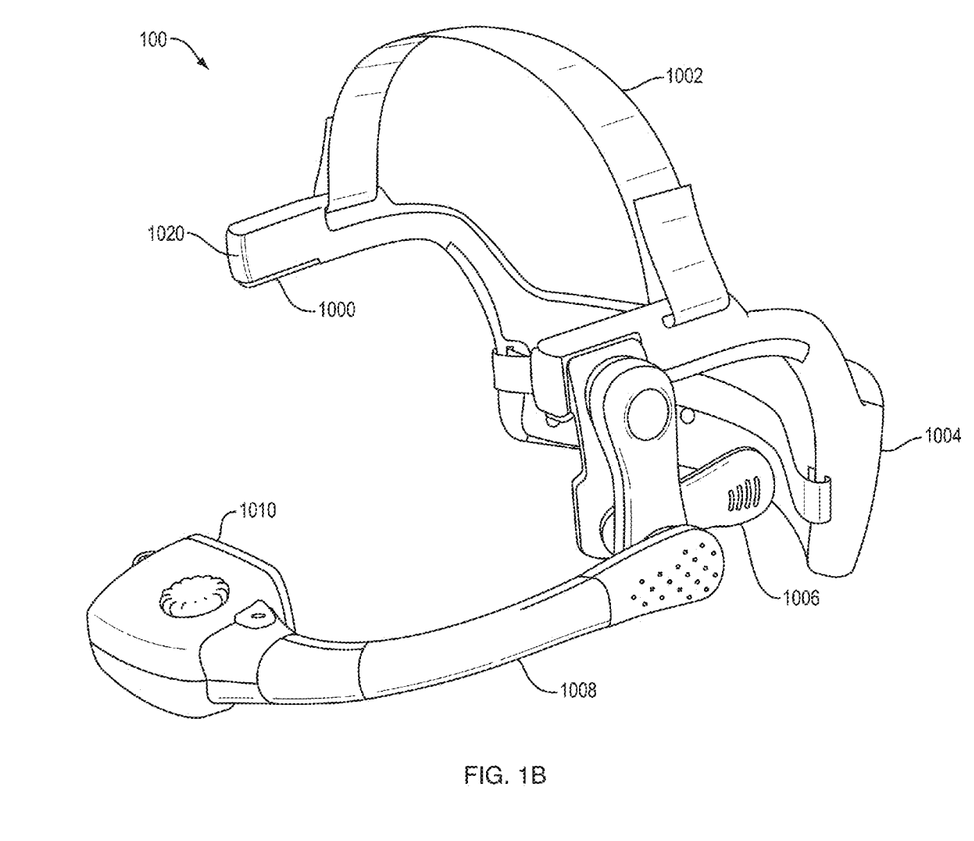

FIGS. 1A and 1B show an example embodiment of a wireless computing headset device 100 (also referred to herein as a headset computer (HSC) or head mounted display (HMD)) that incorporates a high-resolution (VGA or better) microdisplay element 1010, and other features described below.

HSC 100 can include audio input and/or output devices, including one or more microphones, input and output speakers, geo-positional sensors (GPS), three to nine axis degrees of freedom orientation sensors, atmospheric sensors, health condition sensors, digital compass, pressure sensors, environmental sensors, energy sensors, acceleration sensors, position, attitude, motion, velocity and/or optical sensors, cameras (visible light, infrared, etc.), multiple wireless radios, auxiliary lighting, rangefinders, or the like and/or an array of sensors embedded and/or integrated into the headset and/or attached to the device via one or more peripheral ports 1020 (FIG. 1B).

Typically located within the housing of headset computing device 100 are various electronic circuits including, a microcomputer (single or multicore processors), one or more wired and/or wireless communications interfaces, memory or storage devices, various sensors and a peripheral mount or mount, such as a "hot shoe."

Example embodiments of the HSC 100 can receive user input through sensing voice commands, head movements, 110, 111, 112 and hand gestures 113, or any combination thereof. A microphone (or microphones) operatively coupled to or integrated into the HSC 100 can be used to capture speech commands, which are then digitized and processed using automatic speech recognition techniques. Gyroscopes, accelerometers, and other micro-electromechanical system sensors can be integrated into the HSC 100 and used to track the user's head movements 110, 111, 112 to provide user input commands. Cameras or motion tracking sensors can be used to monitor a user's hand gestures 113 for user input commands. Such a user interface may overcome the disadvantages of hands-dependent formats inherent in other mobile devices.

The HSC 100 can be used in various ways. It can be used as a peripheral display for displaying video signals received and processed by a remote host computing device 200 (shown in FIG. 1A). The host 200 may be, for example, a notebook PC, smart phone, tablet device, or other computing device having less or greater computational complexity than the wireless computing headset device 100, such as cloud-based network resources. The headset computing device 100 and host 200 can wirelessly communicate via one or more wireless protocols, such as Bluetooth®, Wi-Fi, WiMAX, 4G LTE or other wireless radio link 150. (Bluetooth is a registered trademark of Bluetooth Sig, Inc. of 5209 Lake Washington Boulevard, Kirkland, Wash. 98033).

In an example embodiment, the host 200 may be further connected to other networks, such as through a wireless connection to the Internet or other cloud-based network resources, so that the host 200 can act as a wireless relay. Alternatively, some example embodiments of the HSC 100 can wirelessly connect to the Internet and cloud-based network resources without the use of a host wireless relay.

FIG. 1B is a perspective view showing some details of an example embodiment of a headset computer 100. The example embodiment HSC 100 generally includes, a frame 1000, strap 1002, rear housing 1004, speaker 1006, cantilever, or alternatively referred to as an arm or boom 1008 with a built in microphone, and a micro-display subassembly 1010.

A head worn frame 1000 and strap 1002 are generally configured so that a user can wear the headset computer device 100 on the user's head. A housing 1004 is generally a low profile unit which houses the electronics, such as the microprocessor, memory or other storage device, along with other associated circuitry. Speakers 1006 provide audio output to the user so that the user can hear information. Micro-display subassembly 1010 is used to render visual information to the user. It is coupled to the arm 1008. The arm 1008 generally provides physical support such that the micro-display subassembly is able to be positioned within the user's field of view 300 (FIG. 1A), preferably in front of the eye of the user or within its peripheral vision preferably slightly below or above the eye. Arm 1008 also provides the electrical or optical connections between the microdisplay subassembly 1010 and the control circuitry housed within housing unit 1004.

According to aspects that will be explained in more detail below, the HSC display device 100 allows a user to select a field of view 300 within a much larger area defined by a virtual display 400. The user can typically control the position, extent (e.g., X-Y or 3D range), and/or magnification of the field of view 300.

While what is shown in FIGS. 1A and 1B is a monocular micro-display presenting a single fixed display element supported on the face of the user with a cantilevered boom, it should be understood that other mechanical configurations for the remote control display device 100 are possible, such as a binocular display with two separate micro-displays (e.g., one for each eye) or a single micro-display arranged to be viewable by both eyes.

Figure 2:
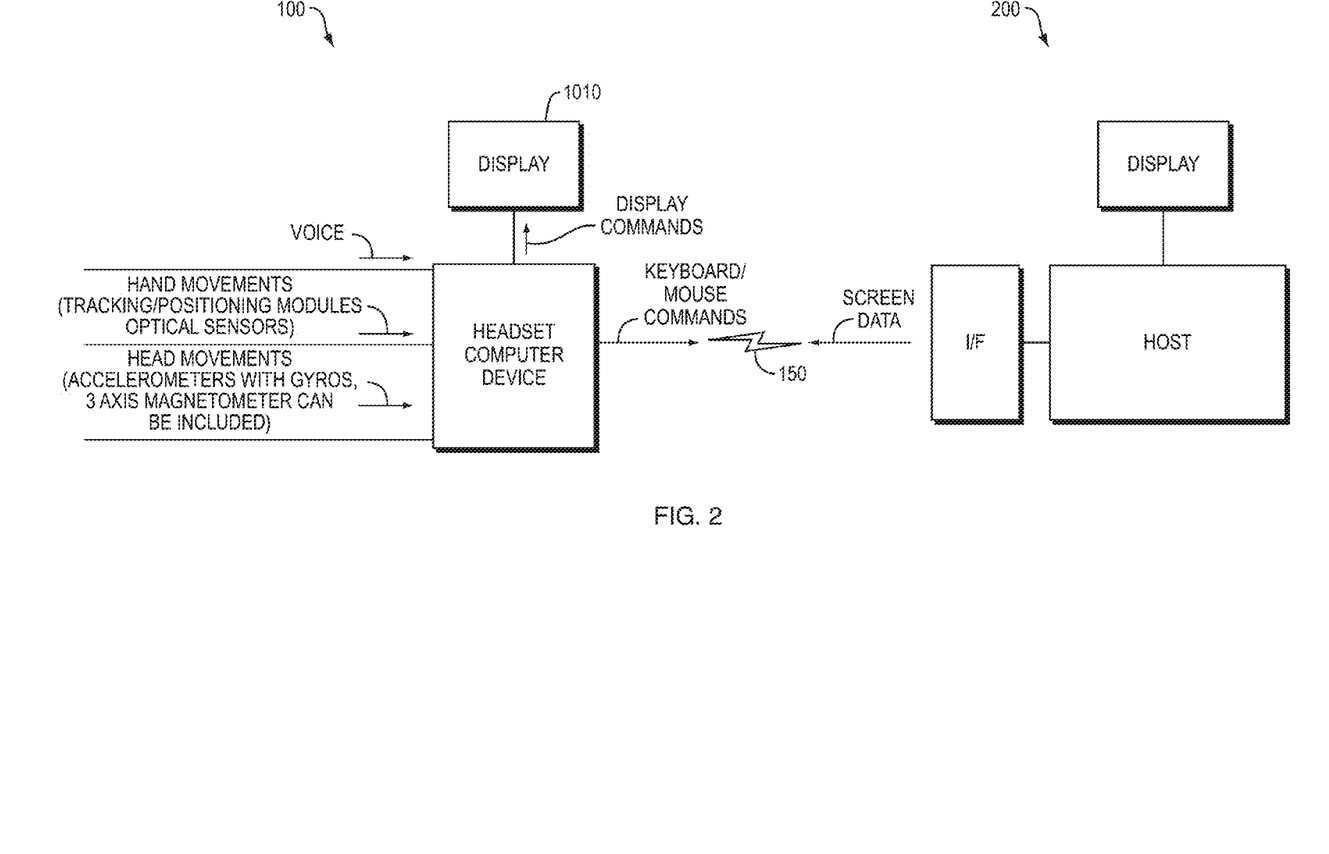
FIG. 2 is a block diagram of flow of data and control in the embodiment of FIGS. 1A-1B.

FIG. 2 is a block diagram showing more detail of an embodiment of the HSC or HMD device 100, host 200 and the data that travels between them. The HSC or HMD device 100 receives vocal input from the user via the microphone, hand movements or body gestures via positional and orientation sensors, the camera or optical sensor(s), and head movement inputs via the head tracking circuitry such as 3 axis to 9 axis degrees of freedom orientational sensing. These are translated by software (processors) in the HSC or HMD device 100 into keyboard and/or mouse commands that are then sent over the Bluetooth or other wireless interface 150 to the host 200. The host 200 then interprets these translated commands in accordance with its own operating system/application software to perform various functions. Among the commands is one to select a field of view 300 within the virtual display 400 and return that selected screen data to the HSC or HMD device 100. Thus, it should be understood that a very large format virtual display area might be associated with application software or an operating system running on the host 200. However, only a portion of that large virtual display area 400 within the field of view 300 is returned to and actually displayed by the micro display 1010 of HSC or HMD device 100.

The HMD 100 contains head-tracking capability. Head-tracking data is captured usually from an accelerometer as described above.

In one embodiment, the HSC 100 may take the form of the device described in a co-pending US Patent Publication Number 2011/0187640, which is hereby incorporated by reference in its entirety.

With head-tracking enabled, HMD 100 displays a reference marker (e.g., a pointer or cross-hairs designator, although other like markers may alternatively be used) on display 1010 screen/screen views. This reference marker may respond to head-tracking, which means that the reference marker on the screen moves within the user's field of view, in relation to movements of the user's head.

For example, if the user moves his head in one direction (e.g., tilted to the left or rotated to the left), the pointer may move to the left in the screen view, and similarly for head movement in a different or opposite direction (e.g., tilted or rotated to the right). Alternatively, in another mode the screen view itself may move and the pointer may remain centrally located with respect to the outer boundaries of the screen view. This second (alternative) mode is suitable and advantageous when viewing a very large document, or screen content that goes beyond the physical screen edges.

When the user operates/manipulates the pointer so that the pointer hovers over an object or command in the display 1010, HMD 100 displays a progress indicator mode to let the user know how long he needs to hover the pointer for the command to execute.

In some embodiments, the progress indicator version of the pointer is a circle or a vertical bar that fills with color, transitions from dark to light, or from shaded to unshaded (or vice versa). The HMD 100 displays the indicator fully colored (or shaded, etc.) to represent that the object or action is selected (i.e., the selection of the command is consummated).

Figure 3:
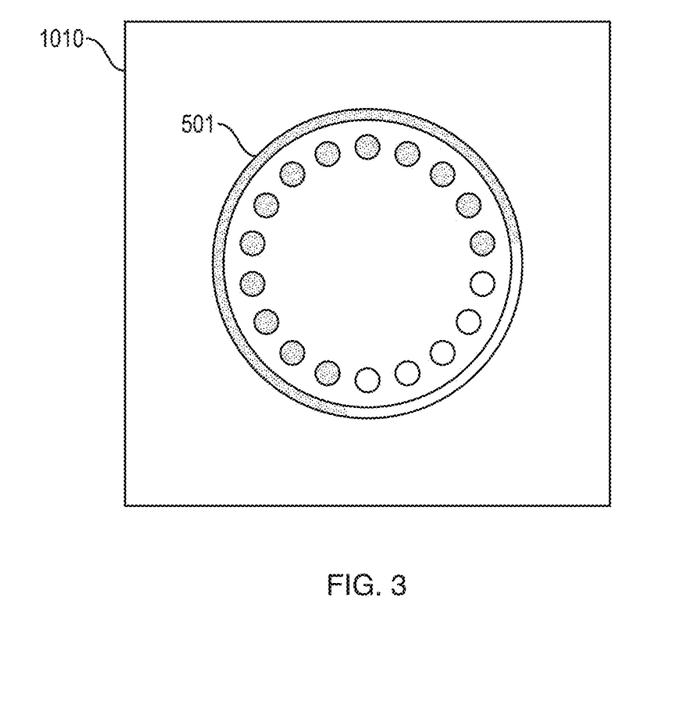
FIG. 3 is a block diagram of embodiments.

For example, in one embodiment, the progress indicator pointer 501 is as illustrated in FIG. 3. In this example, the indicator pointer 501 (also referred to herein as a pointer-timer) is a circle with a number of individual elements distributed around the perimeter of the circle. In general, the elements can take on one of two (or more) characteristics. In this particular example, some of the elements are shaded, some are light, but the characteristics could be other distinctions such as colored/uncolored, first color/second color, shaded/non-shaded, and so on. The distinctions could vary across a spectrum of characteristics (e.g., from white to lightly-shaded to darkly-shaded to black, or across a spectrum of colors, and so on). The progress indicator pointer 501 may be otherwise visually configured to represent a timer for completing command selection.

The amount of time for the progress indicator timer 501 to go from an initial state (e.g., all individual elements shaded) to a completed state (e.g., all individual elements unshaded) may be a predetermined interval (e.g., two to three seconds). Once the progress indicator is in the completed state, the selection of the associated selectable command is accepted (i.e., consummated). A user can thus perform the equivalent of clicking on a button icon with a mouse device, without using his hands.

The user can cancel the command (selection thereof) by moving the pointer 501 away from the selectable object or command before the indicator fills up (is fully colored or shaded, etc.). In one embodiment, the pointer 501 immediately reverts to the initial state when the pointer 501 is moved away from the selectable object. In other embodiments, the pointer 501 gradually reverts to the initial state when the pointer is moved away from the selectable object. The amount of time it takes for the pointer to revert to the initial state may be a predetermined time period. In some embodiments, that time period may be selectable by the user, for example as part of a set-up procedure.

This selection technique operates on the assumption that the entire screen view is not full of selectable objects, and that there is "whitespace" between and around selectable objects. In other words, having space available without selectable objects allows the user to move the pointer to a non-selectable place if the user wishes to abort a selection of a selectable object.

If a progress indicator reaches the completed state, the resulting action will depend upon what the selected object or command is. On objects that can be cut, copied or pasted, then upon completed selection, the screen view may show the valid voice commands for that object, in a cluster around the selected object.

Other uses of this selection technique may include, for example, user selection of (i) buttons within a dialog box, (ii) objects in a file explorer or (iii) instances in a list view.

The selection technique could be complemented by voice commands to allow multiple selections. For example, the user could issue a voice command such as "select three," so that the next three selectable objects selected with the progress indicator will become a selected combination.

Figure 4:
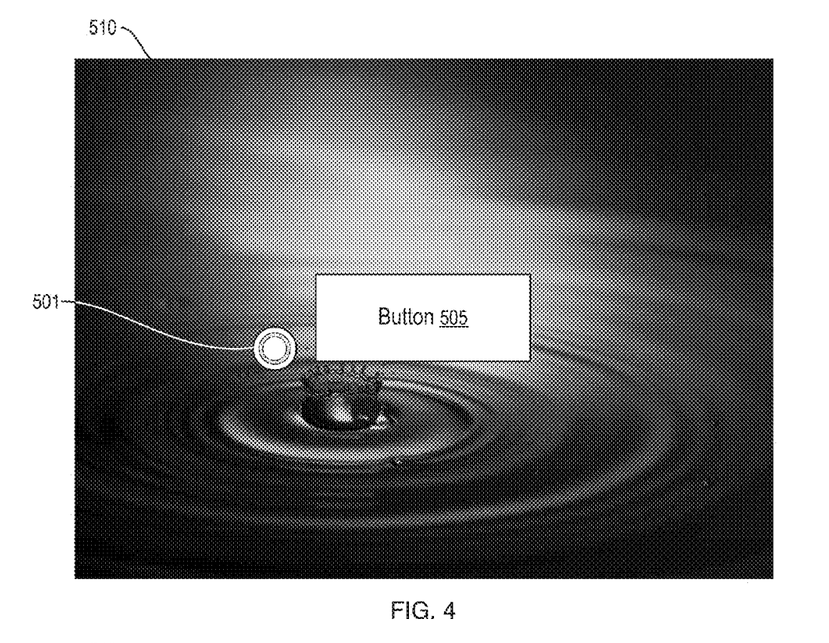
FIGS. 4-7 are schematic views illustrating use of embodiments in example graphical user interface.

One embodiment of the full selection process is shown in non-limiting example FIGS. 4-7. FIG. 4 shows the Pointer-timer 501, currently not over a subject button 505, displayed in screen view 510. This example shows the Pointer-timer 501 as shaded, with no individual elements shown to indicate the Pointer-timer 501 is not overlapping any selectable objects 505 (buttons). In other embodiments, the Pointer-timer may show the perimeter elements in their initial state (e.g., all darkened, colored, shaded, whitened, clear, etc.) when not overlapping a selectable object 505.

Figure 5:
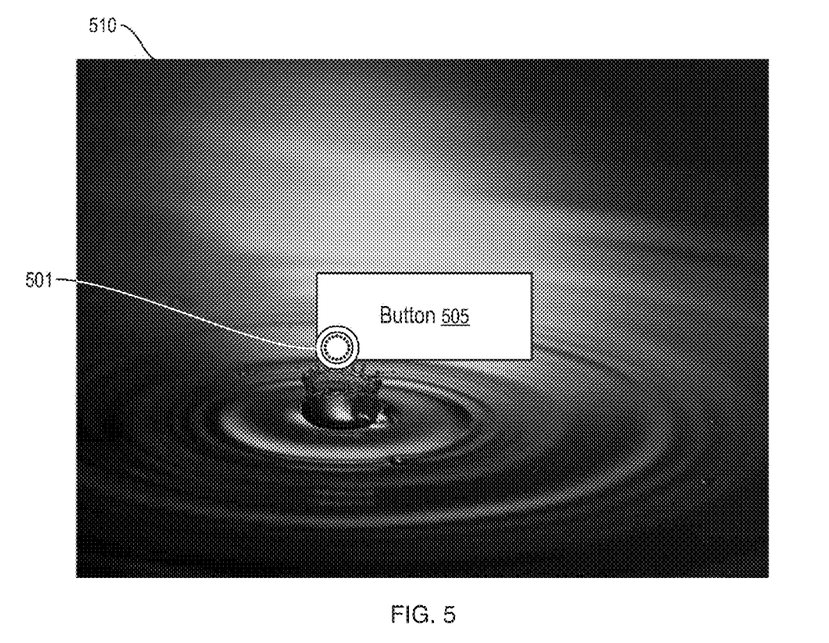
Figure 6:
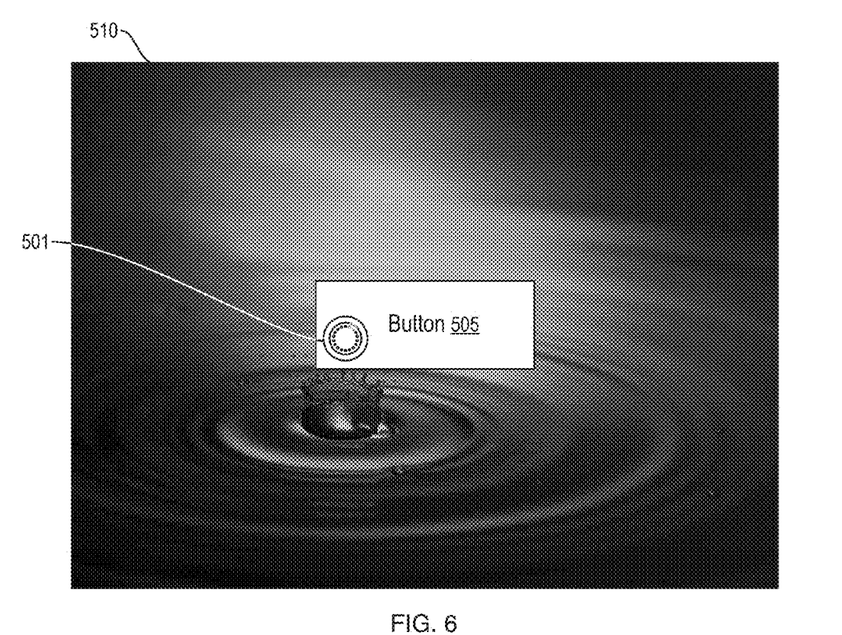
Figure 7:
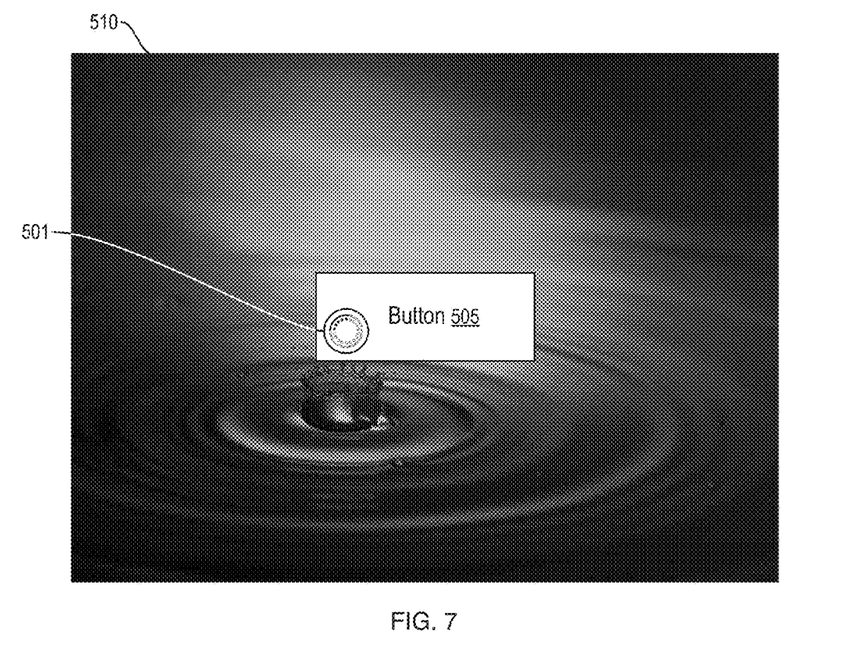

As illustrated in FIG. 5, when the user moves the Pointer-timer 501 over a button 505 or other selectable object displayed in the screen view 510, a ring of small elements (e.g., circles, squares) appear around the circumference of the Pointer-timer 501. In this example, each element of the ring of elements is shaded. HSC 100 begins to unshade each element, one by one, in the ring (for example) to show the timer working FIGS. 6 and 7 show evolution of the periphery elements un-filling (e.g., removing color, shading and such).

When the pointer-timer 501 has completed and is in the final state (i.e., each of the periphery elements has been unshaded or otherwise cleared), the selection of the subject button 505 will be made by HSC 100 (e.g., a processor thereof). As outlined above, this typically takes two to three seconds, although in some embodiments the time from the initial state to the final state when selection is consummated may be shorter or longer than two to three seconds. In other embodiments, the user may set, as a preference, the amount of time the pointer-timer needs to remain on a selectable object 505 for the selection to consummate.

Figure 8:
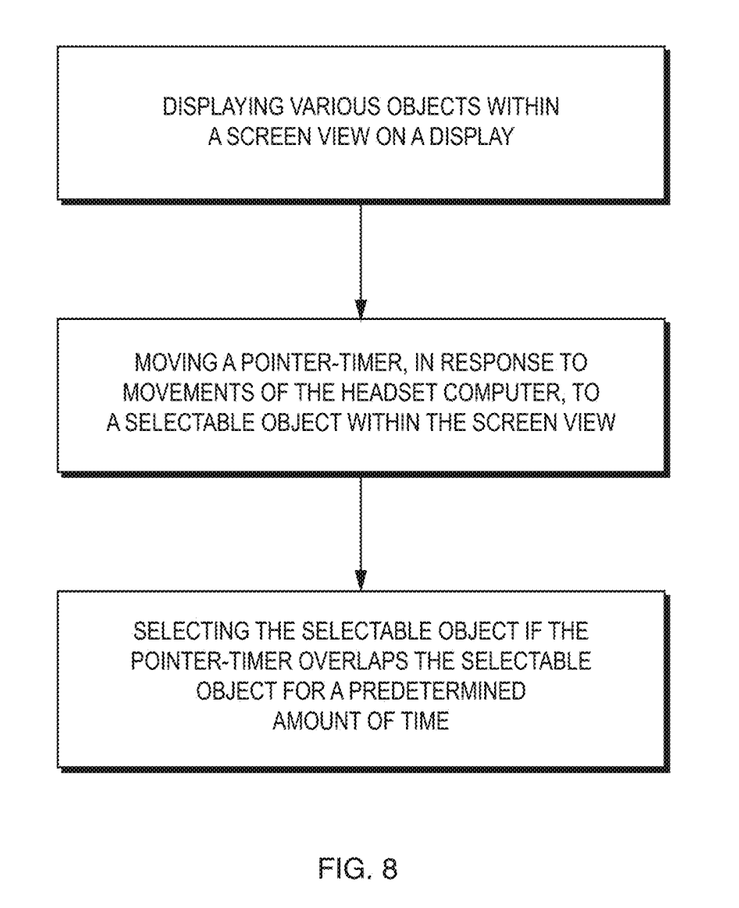
FIG. 8 is a flow diagram according to one embodiment of the invention.

FIG. 8 is a flow diagram according to one of the described embodiments.

Accordingly, aspects of this invention provide the user with an easy way to select objects on screen where voice-commands cannot be used or are not the preference when the selection needs to be made.

It will be apparent that one or more embodiments described herein may be implemented in many different forms of software and hardware. Software code and/or specialized hardware used to implement embodiments described herein is not limiting of the embodiments of the invention described herein. Thus, the operation and behavior of embodiments are described without reference to specific software code and/or specialized hardware—it being understood that one would be able to design software and/or hardware to implement the embodiments based on the description herein.

Further, certain embodiments of the example embodiments described herein may be implemented as logic that performs one or more functions. This logic may be hardware-based, software-based, or a combination of hardware-based and software-based. Some or all of the logic may be stored on one or more tangible, non-transitory, computer-readable storage media and may include computer-executable instructions that may be executed by a controller or processor. The computer-executable instructions may include instructions that implement one or more embodiments of the invention. The tangible, non-transitory, computer-readable storage media may be volatile or non-volatile and may include, for example, flash memories, dynamic memories, removable disks, and non-removable disks.

While this invention has been particularly shown and described with references to example embodiments thereof, it will be understood by those skilled in the art that various changes in form and details may be made therein without departing from the scope of the invention encompassed by the appended claims.

What is claimed is:

1. A headset computer comprising:
    a display having screen views showing various objects; and
    a processor coupled to the display and operating a graphical user interface in the screen view, the graphical user interface including a pointer-timer, displayed within a screen view and movable within the screen view in relation to movements of the user's head, that indicates working of object selection in the screen view;
    the pointer-timer transitions from a first state to a second state over a first predetermined period of time while the pointer-timer overlaps a selectable object within the screen view, and the pointer-timer reverts to the first state gradually over a second predetermined period of time when the pointer-timer ceases to overlap the selectable object.

2. The headset computer of claim 1, wherein the pointer-timer includes a collection of elements that sequentially transition from the first state to the second state, such that the collection of elements gradually changes from all being in the first state to all being in the second state.

3. The headset computer of claim 2, wherein the pointer-timer is circular, and the collection of elements is distributed along the perimeter of the pointer-timer.

4. The headset computer of claim 1, wherein the first state is a substantially complete absence of a characteristic, and the second state is a substantially complete presence of the characteristic.

5. The headset computer of claim 4, wherein the characteristic is one or more of color, shading, cross-hatching, visual texturing.

6. The headset computer of claim 1, wherein if the pointer-timer remains overlapped with the selectable object when the pointer-timer reaches the second state, the selection of the selectable object is consummated.

7. A method of performing a hands-free selection of an object on a display, comprising:
    on headset computer, including a processor,
        displaying various objects within a screen view on a display;
        moving a pointer-timer displayed within the screen view, in response to movements of the headset computer, to a selectable object within the screen view;
        selecting the selectable object if the pointer-timer overlaps the selectable object for a predetermined amount of time;
        the pointer-timer transitioning from a first state to a second state over a first predetermined period of time while the pointer-timer overlaps a selectable object within the screen view, and the pointer-timer reverting to the first state gradually over a second predetermined period of time when the pointer-timer ceases to overlap the selectable object.

8. The method of claim 7, wherein the pointer-timer includes a collection of elements that sequentially transition from the first state to the second state, such that the collection of elements gradually changes from all being in the first state to all being in the second state.

9. The headset computer of claim 8, wherein the pointer-timer is circular, and the collection of elements is distributed along the perimeter of the pointer-timer.

10. The headset computer of claim 7, wherein the first state is a substantially complete absence of a characteristic, and the second state is a substantially complete presence of the characteristic.

11. The headset computer of claim 10, wherein the characteristic is one or more of color, shading, cross-hatching, visual texturing.

12. The headset computer of claim 7, further including consummating the selection of the selectable object if the pointer-timer remains overlapped with the selectable object when the pointer-timer reaches the second state.

\* \* \* \* \*